United States Patent [19]

Gaku et al.

[11] 4,369,304

[45] Jan. 18, 1983

[54] CURABLE RESIN COMPOSITION OF (1) POLYFUNCTIONAL CYANATE ESTER, (2) ACRYLIC OR METHACRYLIC ESTER AND (3) MALEIMIDE

[75] Inventors: Morio Gaku, Showamachi; Nobuyuki Ikeguchi, Tokyo, both of Japan

[73] Assignee: Mitsubishi Gas Chemical Company, Inc., Tokyo, Japan

[21] Appl. No.: 175,509

[22] Filed: Aug. 5, 1980

[30] Foreign Application Priority Data

Aug. 8, 1979 [JP] Japan .................................. 54/100928

[51] Int. Cl.³ ...................... C08G 73/10; C08F 22/40
[52] U.S. Cl. ..................................... 528/322; 525/185; 525/205; 525/230; 525/422; 528/86; 528/117; 528/119; 528/170; 528/172; 528/211; 528/248; 528/253; 428/473.5
[58] Field of Search ................. 528/322, 86, 117, 119, 528/170, 172, 211, 248, 253; 525/422, 185

[56] References Cited

U.S. PATENT DOCUMENTS 3,448,079  6/1969  Grigat et al. ........................ 260/59
3,553,244  1/1971  Grigat et al. ........................ 260/453
3,562,214  2/1971  Kubens et al. ........................ 260/47
3,740,348  6/1973  Grigat et al. ................. 260/453 AL
3,755,402  8/1973  Grigat et al. ................. 260/453 AR
4,022,755  5/1977  Tanigaichi et al. ............... 260/59 R
4,026,913  5/1977  Tanigaichi et al. ................ 260/463
4,110,364  8/1978  Gaku et al. ......................... 528/170
4,330,669  5/1982  Ikeguchi et al. .................... 528/322

FOREIGN PATENT DOCUMENTS 1060933  3/1967  United Kingdom .

Primary Examiner—Harold D. Anderson
Attorney, Agent, or Firm—Fleit & Jacobson

[57] ABSTRACT

A curable resin composition comprising a mixture and/or a preliminary reaction product of (a) polyfunctional cyanate ester, prepolymer of the cyanate ester, or coprepolymer of the cyanate ester and an amine, (b) acrylic esters, methacrylic esters, prepolymers of acrylic esters, prepolymers methacrylic esters, coprepolymers of acrylic esters and methacrylic esters and mixtures thereof, and (c) a polyfunctional maleimide, prepolymer of the maleimide or coprepolymer of the maleimide and an amine are disclosed. Cured resin having excellent impact-resistance, adhesive power, heat-resistance and chemical-resistance can be prepared from the compositions.

3 Claims, No Drawings

CURABLE RESIN COMPOSITION OF (1) POLYFUNCTIONAL CYANATE ESTER, (2) ACRYLIC OR METHACRYLIC ESTER AND (3) MALEIMIDE

BACKGROUND OF THE INVENTION

This invention relates to a curable resin composition comprising a mixture and/or a preliminary reaction product of (a) a polyfunctional cyanate ester, prepolymer of the cyanate ester or coprepolymer of the cyanate ester and an amine (sometimes hereinunder referred to as component (a)), (b) at least one compound selected from the group consisting of acrylic esters, methacrylic ester, prepolymers of acrylic esters, prepolymers of methacrylic esters, coprepolymers of acrylic esters and methacrylic esters and mixtures thereof (sometimes hereinunder referred to as component (b)) and (c) a polyfunctional maleimide, prepolymer of the maleimide or coprepolymer of the maleimide and an amine (sometimes hereinunder referred to as component (c)). Cured resin obtained by curing each of the resin compositions has excellent impact-resistance, adhesive power, heat-resistance and chemical resistance.

In the prior art, the cured resin obtained by cast-molding a composition containing a polyfunctional maleimide and a polyfunctional cyanate ester has low impact resistance. Similarly, the cured resin obtained by cast-molding acrylic esters, methacrylic esters, prepolymers of acrylic esters or methacrylic esters, or mixtures thereof is low heat-resistant.

SUMMARY OF THE INVENTION

The present inventors carried out research for obtaining a cured resin having excellent impact resistance and excellent adherence to the substrate. As a result it was found that when a curable resin composition comprising a mixture and/or a preliminary reaction product of (a) a polyfunctional cyanate ester, prepolymer of the cyanate ester or coprepolymer of the cyanate ester and an amine, and an acrylic ester or its prepolymer, a methacrylic ester or its prepolymer, or coprepolymer of the acrylic ester and the methacrylic ester, and (c) a polyfunctional maleimide, prepolymer of the maleimide or coprepolymer of the maleimide and an amine is cured, a cured resin having the above mentioned desirable properties can be obtained. This invention is based on this discovery.

DETAILED DESCRIPTION OF THE INVENTION

By polyfunctional cyanate ester is meant a compound having at least two cyanate groups in its molecule. The polyfunctional cyanate ester is represented by the formula $$R(\!-\!O\!-\!C\!\equiv\!N)_m$$

wherein R is an aromatic nucleus-containing residue which is selected from the group consisting of a residue derived from an aromatic hydrocarbon selected from the group consisting of benzene, biphenyl and naphthalene, a residue derived from a compound in which at least two benzene rings are bonded to each other by a bridging member selected from the group consisting of

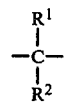

wherein $R^1$ and $R^2$ are the same or different and each represents a hydrogen atom or an alkyl group containing 1 to 4 carbon atoms, —O—, —CH$_2$OCH$_2$—, —S—,

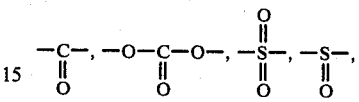

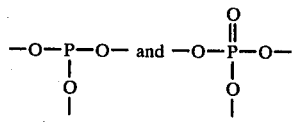

said aromatic nucleus is optionally substituted by a substituent selected from the group consisting of alkyl groups containing 1 to 4 carbon atoms, alkoxy groups containing 1 to 4 carbon atoms, chlorine and bromine; m is an integer of 2 to 5, and the cyanate group is always directly bonded to the aromatic nucleus.

Examples of the polyfunctional cyanate ester include dicyanatobenzene; 1,3,5-tricyanatobenzene; 1,3-, 1,4-, 1,6-, 1,8-, 2,6- or 2,7-dicyanatonaphthalene; 1,3,6-tricyanatonaphthalene; 4,4'-dicyanatobiphenyl; bis(4-cyanatophenyl)methane; 2,2-bis(4-cyanatophenyl)propane, 2,2-bis(3,5-dichloro-4-cyanatophenyl)propane, 2,2-bis(3,5-dibromo-4-dicyanatophenyl)propane; bis(4-cyanatophenyl)ether; bis(4-cyanatophenyl)thioether; bis(4cyanatophenyl)sulfone; tris(4-cyanatophenyl)-phosphite; tris(4-cyanatophenyl)phosphate; bis(3-chloro-4-cyanatophenyl)methane; cyanated novolak derived from novolak cyanated bisphenol type polycarbonate oligomer derived from bisphenol type polycarbonate oligomer and mixtures thereof. Other cyanate esters employed in the practice of this invention are given in Japanese Patent Publication Nos. 1928/1966, 4791/1969, 11712/1970 and 41112/1971 and Japanese Patent Publication (laid open) No. 63129/1976 which are incorporated herein for references. The above mentioned cyanate esters may be used as mixtures.

Prepolymers may be used containing a sym-triazine ring which is prepared by the trimerization of the cyanate groups of the cyanate ester, and which have an average molecular weight of at least 400 but no more than 6,000. Such prepolymers can be prepared by polymerizing the above cyanate esters in the presence of, as a catalyst, an acid such as a mineral acid or a Lewis acid, a base such as sodium hydroxide, a sodium alcoholate or a tertiary amine, or a salt such as sodium carbonate or lithium chloride.

The polyfunctional cyanate ester can be used in the form of a mixture of the monomer and the prepolymer. For example, many of the commercially available cyanate esters derived from bisphenol A and cyanogen halide are in the form of mixtures of cyanate monomers and prepolymers, and such materials can also be used in the present invention.

A coprepolymer of the cyanate ester and an amine may be used as the cyanate ester component. Examples of the amines include meta- or para-phenylenediamine, meta- or para-xylylenediamine, 1,4- or 1,3-cyclohexanediamine, hexahydroxylylenediamine, 4,4'-diaminobiphenyl, bis(4- aminophenyl)methane, bis(4-aminophenyl)ether, bis(4-aminophenyl)sulfone, bis(4-amino-3-methylphenyl)methane, bis(3-chloro-4-aminophenyl)methane, bis(4-amino-3,5-dimethylphenyl)methane, bis(4-aminophenyl)cyclohexane, 2,2-bis(4-aminophenyl)propane, 2,2-bis(4-amino-3-methylphenyl)propane, 2,2-bis(3,5-dibromo-4-aminophenyl)propane, bis(4-aminophenyl)phenylmethane, 3,4-diaminophenyl-4'-aminophenylmethane and 1,1-bis(4-aminophenyl)-1-phenylethane.

A mixture of prepolymer of the cyanate ester and coprepolymer of the cyanate ester and an amine may be used as component (a) of this invention.

The acrylic ester or methacrylic ester is represented by the formula

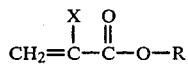

wherein X is hydrogen or methyl; and R is straight or branched chain cycloalkyl having 3–12 carbon atoms; aromatic hydrocarbon having 6–16 carbon atoms; straight or branched chain halogen-substituted cycloalkyl having 3–12 carbon atoms; or halogen-substituted aromatic hydrocarbon having 6–16 carbon atoms. The acrylic ester or methacrylic ester may be prepolymerized by means of an organic peroxide, an ionic polymerization catalyst, heat or ultraviolet radiation. Prepolymer of the acrylic ester or the methacrylic ester or coprepolymer of the acrylic ester and the methacrylic ester may be used as component (b).

The polyfunctional maleimides employed in the present invention are organic compounds having two or more maleimide groups derived from maleic anhydride and a polyamine and are represented by the following general formula

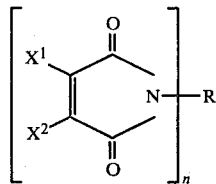

wherein R represents divalent to pentavalent aromatic or alicyclic organic group, each of $X^1$ and $X^2$ represent a hydrogen atom, halogen atom or alkyl group, and n represents integer of 2–5.

The maleimides represented by the above formula can be produced by a method known per se which involves reacting maleic anhydride with polyamine to form a maleamide acid, and then dehydro-cyclizing the maleamide acid.

Aromatic amine are preferably as the starting polyamines. The reason is that the resulting object resin has excellent properties, such as heat-resistance, etc. When the resulting object resins have desirable flexibility and pliability, alicyclic amine alone or combinations of the alicyclic amines and other amines may be used. Though secondary amines can be used as the starting amine, the primary amines are preferable.

Amines employed in reaction with cyanate esters for preparing coprepolymers of the cyanate ester and the amine may be profitably used as an amine component for preparing maleimides. In addition to the above mentioned amines, melamin having s-triazine ring and polyamines obtained by reaction aniline with formaldehyde, in which two or more benzene rings are bonded through methylene bond, may also be used.

The functional maleimides as mentioned above may be used alone or as a mixture. Also the prepolymer of the maleimide obtained by heating the maleimide in the presence or absence of a catalyst may be used. In addition, coprepolymers of the maleimide and the amine employed for synthesizing the polyfunctional maleimide may be used.

The curable composition of this invention may be prepared by merely mixing the above mentioned components (a), (b) and (c) or by using the product of preliminary reaction of these components.

The ratio of components (a)+(c) to component (b) is not critical. The ratio by weight of components (a)+(c) to component (b) may be in the range of from 99:1 to 1:99, preferably from 95:5 to 35:65. For example, when it is necessary for a cured resin to have heat resistance, more components (a)+(c) is used than component (b).

The ratio of component (a) to component (c) is not critical. The ratio by weight thereof may be in the range of from 99:1 to 5:95.

The curable composition of this invention comprises a mixture and/or a preliminary reaction product of (a) at least one compound selected from the group consisting of polyfunctional cyanate esters, prepolymers of the cyanates esters or coprepolymers of the cyanate esters and an amine, (b) at least one compound selected from the group consisting of acrylic esters, methacrylic esters, prepolymers of acrylic esters, prepolymers of methacrylic esters, coprepolymers of acrylic esters and methacrylic esters and mixtures thereof and (c) at least one compound selected from the group consisting of polyfunctional maleimides, prepolymers of the maleimides and coprepolymers of the maleimides and an amine and/or (d) other component. The composition may be a mixture of components (a) and (b) and (c) and optionally (d); a preliminary reaction product of components (a), (b) and (c) or components (a), (b), (c) and (d); a mixture of preliminary reaction product of two or three of components (a), (b), (c) and (d) and the remainder thereof. Other components (d) include epoxy resins; (meth) acrylates, such as methacrylic epoxy esters, acrylic epoxy esters, acrylic alkenyl esters, methacrylic alkenyl esters, its prepolymers; polyallyl compounds, such as diallyl phthalate, divinylbenzene, diallylbenzene, trialkenyl isocyanulates or its prepolymers; phenol resins; polyvinyl acetal resin, such as polyvinyl formal, polyvinyl acetal, or polyvinyl butyral; acrylic resins, silicone resins, or alkyd resins having OH group or COOH group; and liquid or elastic rubbers, such as polybutadiene, butadiene-acrylonitrile copolymer, polychloroprene, butadiene-styrene copolymer, polyisoprene or natural rubbers.

The curable composition of this invention may be reticulated by heating it alone to form a cured resin having heat resistance. In general, a catalyst may be used in order to promote crosslinking reaction of the components in the composition.

Examples of the catalysts include imidazoles, such as 2-methylimidazole, 2-undecylimidazole, 2-heptadecyl imidazole, 2-phenylimidazole, 2-ethyl 4-methylimidazole, 1-benzyl-2-methylimidazole, 1-propyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, 1-guanaminoethyl-2-methylimidazole and addition product of an imidazole and trimellitic acid; tertiary amines, such as N,N-dimethyl benzylamine, N,N-dimethylaniline, N,N-dimethyl-toluidine, N,N-dimethyl-p-anisidine, p-halogeno-N,N-dimethyl-aniline, 2-N-ethylanilino ethanol, tri-n-butylamine, pyridine, quinoline, N-methyl-morpholine, triethanolamine, triethylenediamine, N,N,N'N'-tetramethylbutanediamine, N-methylpiperidine; phenols, such as phenol, cresol, xylenol, resorcine, and phloroglucin; organic metal salts, such as lead naphthenate, lead stearate, zinc naphthenate, zinc octoate, tin oleate, dibutyl tin maleate, manganese naphthenate, cobalt naphthenate, and acetyl acetone iron; and inorganic metal salts, such as stannic chloride, zinc chloride and aluminum chloride; peroxides, such as benzoyl peroxide, lauroyl peroxide, octanoyl peroxide, acetyl peroxide, para-chlorobenzoyl peroxide and di-t-butyl diperphthalate, acid anhydrides, such as maleic anhydride, phthalic anhydride, lauric anhydride, pyromellitic anhydride, trimellitic anhydride, hexahydrophthalic anhydride, hexahydropyromellitic anhydride and hexahydrotrimellitic anhydride, azo compounds, such as azoisobutylonitrile, 2,2'-azobispropane, m,m'-azoxystyrene, and mixtures thereof.

In addition to the above mentioned catalysts, a curing agent for epoxy resin and a curing catalyst for epoxy resin may be used as a catalyst of this invention.

The amount of the catalyst employed may be less than 5% by weight of total composition.

A variety of additives may be added to the curable composition to impart specific properties provided that they do not impair the essential properties of the resulting resin. Examples of the additives include natural or synthetic resins, fibrous reinforcement, fillers, pigments, dyestuffs, thickening agents, lubricants, flame-retardants and the like.

The curable compositions of this invention are present in a wide range of forms from liquid to solid at room temperature, depending on the natures of the components constituting the composition, and the preliminary reaction conditions. Solid curable composition, liquid curable composition or solution of the composition in solvent may be used according to the use purpose.

The curing conditions of the curable composition of this invention depend on the proportions of components constituting the composition and the nature of the components employed. In general, the composition of this invention may be cured by heating it at a temperature within the range of 100°–250° C.

When the curable composition of this invention is used for preparing molding, laminate, adhesive-assembly, press means is preferably applied to the molding, laminate or adhesive-assembly in the heat curing step. In general, these products may be pressed at a superpressure of 10–500 Kg/cm².

The composition of this invention is rapidly curable and is cured even under mild conditions, so is especially suitable when quantity production and ease of workability are desired. The cured resin made from the composition not only has excellent adhesive force, bond strength, heat resistance, and electric properties, but also is excellent in impact resistance, chemical resistance, moisture resistance and the like. The composition of this invention has a variety of uses: as a coating material for rust prevention, flame resistance, flame retardance and the like; as electrical insulating varnish; as adhesive; in laminates to be used for furniture, building materials, sheathing materials, electrical insulating materials, and the like; and in a variety of moldings.

The present invention is further illustrated by the following non-limiting Examples and Comparative Examples. Percent and parts are by weight, unless otherwise specified.

EXAMPLE 1

200 g Of methyl methacrylate was preliminarily polymerized at 90° C. for 1 hour in the presence of 1 g of benzoyl peroxide to obtain viscous polymer. To the resin was added resin composition obtained by reacting 900 g of 2,2-bis(4-cyanatophenyl)propane and 100 g of bis(4-maleimidophenyl)ether at 160° C. for 3 hours. In addition, 2 g of triethylene diamine and 4 g of zinc octoate were added to the mixture. The polymerization was effected at 50° C. under vacuum for 24 hours to obtain a cured product in the form of plate. The product was cured at 150° C. for another 7 hours. The physical data of the product are shown in Table 1.

CONTROL TEST 1

The procedure of Example 1 was repeated except that methyl methacrylate was not used. The physical data on the resulding plate are shown in Table 1.

CONTROL TEST 2

A plate was prepared from methyl methacrylate in the same way as in Example 1.

TABLE 1

|  | Example 1 | Control Test 1 | Control Test 2 |
|---|---|---|---|
| Impact strength* | O | X | O |
| Glass transition temperature (°C.) | 170 | 243 | 97 |

*Impact strength

Spherical iron weighing 1000 g was dropped from a height of 2 m on a 10 cm × 10 cm plate 2 mm thick. The symbol "O" shows that the plate was not cracked, whereas symbol "X" shows that the plate was cracked.

EXAMPLE 2

Prepolymer was prepared by reacting 800 g of 1,4-dicyanatobenzene, 160 g of bis(4-maleimidophenyl)methane and 40 g of mixture of 4-maleimidophenyl-3',4'-dimaleimidophenyl methane and 4-maleimidophenyl-2',4'-dimaleimidophenyl methane at 160° C. for 65 minutes. The resulting prepolymer and 200 g of novolak-type epoxy resin (ECN-1273 Ciba Geigy AG) were dissolved in methyl ethyl ketone to obtain Solution A.

100 g Of the viscous polymer of methyl methacrylate prepared in the same way as Example 1, Solution A and 0.5 g of zinc octoate and 0.5 g of triethylene diamine as a catalytic composite were mixed together.

The resulting solution was coated on a metal surface, was cured at 60° C. for 15 hours and was further cured at 140° C. for another 24 hours. The resulting coating was good and had a pencil hardness of 3H.

EXAMPLE 3

800 g Of butyl methacrylate was dissolved in acetone 0.7 of benzoyl peroxide was added to the solution. The polymerization of butyl methacrylate was effected for 5 hours while refluxing. To the solution were added preliminary reaction product obtained by preliminarily reacting 150 g of 2,2-bis(4cyanatophenyl)propane and 50 g of bis(4-maleimidophenyl)sulfone at 150° C. for 140 minutes and 0.4 g of zinc octoate and 0.3 g of triethylene diamine as a catalytic composite. The mixture was stirred.

The resulting solution was coated on a metal surface, was cured at 70° C. for 4 hours and was cured at 140° C. for another 10 hours. The resulting coating was good and had a pencil hardness of 3H. The crosscut adhesive test result was 100/100.

EXAMPLE 4

| | |
|---|---|
| 2,2-bis(4-cyanatophenyl)propane | 480 g |
| bis(4-maleimidophenyl)methane | 120 g |
| lauryl methacrylate | 400 g |
| benzoyl peroxide | 0.3 g |

The above components were dissolved in a mixture of N,N-dimethyl foramide and methyl ethyl ketone so that the ratio of resin to solvent was 1:1. The mixture was stirred at 100° C. under superpressure for 3 hours.

To the resulting preliminary reaction product were added 0.07 g of zinc octylate and 0.06 g of triethylene diamine as a catalytic composite. The solution was coated on a 125 mm×25 mm×0.4 mm epoxy resin test piece and was heated to form B-staged test pieces. Two test pieces were placed one on the other by facing the B-staged surfaces so that their longitudinal ends overlapped by 10 mm. The B-staged product was cured at 120° C. for 11 hours, and cured at 150° C. for another 3 hours. Thickness of the overlapped portion was 2.00 mm and adhesive strength under shear thereof was 102 Kg/cm$^2$.

What is claimed is:
1. A curable resin composition comprising:
   (a) at least one cyanate ester compound selected from the group consisting of:
      (1) of polyfunctional aromatic cyanate ester monomer having the formula:

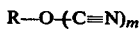

wherein m is 2 to 5 and R is an aromatic organic group, the cyanate groups being bonded to an aromatic ring of said aromatic organic group,
      (2) a homoprepolymer of one or more polyfunctional aromatic cyanate ester monomers of (1), and
      (3) a coprepolymer of (1) and an amine; and
   (b) at least one acrylic ester or methacrylic ester compound, said acrylic ester or methacrylic ester being represented by the formula

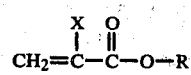

wherein X is hydrogen or methyl, and R is a straight or branched chain cycloalkyl having 3 to 12 carbon atoms, an aromatic hydrocarbon having 6 to 16 carbon atoms, a straight or branched chain halogen-substituted cycloalkyl having 3 to 12 carbon atoms, or a halogen-substituted aromatic hydrocarbon having 6 to 16 carbon atoms, said compound being selected from the group consisting of the acrylic esters, homoprepolymers of acrylic esters, homoprepolymers of methacrylic esters, coprepolymers of acrylic esters and methacrylic esters and mixtures thereof; and
   (c) at least one compound selected from the group consisting of:
      (1) a polyfunctional maleimide,
      (2) a homoprepolymer of one or more polyfunctional maleimides, and
      (3) a coprepolymer of (1) and an amine, said composition including a mixture of components (a), (b) and (c), a preliminary reaction product of components (a), (b) and (c), the combination of said mixture and said preliminary reaction product, the combination of (a) and the preliminary reaction product of (b) and (c), the combination of (b) and the preliminary reaction product of (a) and (c), or the combination of (c) and the preliminary reaction product of (a) and (b).

2. The composition as defined in claim 1 wherein the cyanate ester is selected from the group consisting of 1,3-, or 1,4-dicyanatobenzene; 1,3,5-tricyanatobenzene; 1,3-, 1,4-, 1,6-, 1,8-, 2,6- or 2,7-dicyanatonaphthalene; 1,3,6-tricyanatonaphthalene; 4,4'-dicyanatobiphenyl; bis(4-cyanatophenyl)methane; 2,2-bis(4-cyanatophenyl)propane, 2,2-bis(3,5-dichloro-4-cyanatophenyl)propane, 2,2-bis(3,5-dibromo-4-dicyanatophenyl)propane; bis(4-cyanatophenyl)ether; bis(4-cyanatophenyl)thioether; bis(4-cyanatophenyl)sulfone; tris(4-cyanatophenyl)phosphite; tris(4-cyanatophenyl)phosphate; bis(3-chloro-4-cyanatophenyl)methane; cyanated novolak produced by reacting a novolak with cyanogen halide, cyanated bisphenol polycarbonate oligomer produced by reacting a bishpenol polycarbonate oligomer with cyanogen halide; and mixtures thereof.

3. The composition as defined in claim 1 wherein the ratio by weight of components (a)+(c) to component (b) is in the range of from 99:1 to 1:99.

* * * * *